US009128856B2

(12) United States Patent
Thottethodi et al.

(10) Patent No.: US 9,128,856 B2
(45) Date of Patent: Sep. 8, 2015

(54) SELECTIVE CACHE FILLS IN RESPONSE TO WRITE MISSES

(71) Applicant: Advanced Micro Devices, Inc., Sunnyvale, CA (US)

(72) Inventors: Mithuna Thottethodi, Bellevue, WA (US); Yasuko Eckert, Kirkland, WA (US); Srilatha Manne, Portland, OR (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 228 days.

(21) Appl. No.: 13/854,724

(22) Filed: Apr. 1, 2013

(65) Prior Publication Data

US 2014/0297961 A1 Oct. 2, 2014

(51) Int. Cl.
*G06F 12/08* (2006.01)

(52) U.S. Cl.
CPC ........ *G06F 12/0875* (2013.01); *G06F 12/0888* (2013.01); *G06F 12/0893* (2013.01)

(58) Field of Classification Search
CPC ............ G06F 12/0804; G06F 12/0875; G06F 12/0888; G06F 12/0891; G06F 12/0897; G06F 12/0893
See application file for complete search history.

(56) References Cited

U.S. PATENT DOCUMENTS

| | | | | |
|---|---|---|---|---|
| 5,634,046 | A | 5/1997 | Chatterjee et al. | |
| 7,100,028 | B2 | 8/2006 | McGrath et al. | |
| 7,685,406 | B2 | 3/2010 | Svec et al. | |
| 2003/0101320 | A1 * | 5/2003 | Chauvel et al. | 711/154 |
| 2007/0266217 | A1 * | 11/2007 | Moyer et al. | 711/170 |

OTHER PUBLICATIONS

David R. Ditzel et al., "Register Allocation for Free: The C Machine Stack Cache", Proc. of ASPLOS-1, Mar. 1982, 9 pages.
Hsien-Hsin S. Lee et al., "Stack value file: custom microarchitecture for the stack", The Seventh International Symposium on High-Performance Computer Architecture, 2001, 10 pages.
Harlan McGhan et al., "PicoJava: A Direct Execution Engine for Java Bytecode", IEEE Computer, Oct. 1998, 9 pages.

* cited by examiner

*Primary Examiner* — Hiep Nguyen
(74) *Attorney, Agent, or Firm* — Park, Vaughan, Fleming & Dowler LLP

(57) ABSTRACT

A cache memory receives a request to perform a write operation. The request specifies an address. A first determination is made that the cache memory does not include a cache line corresponding to the address. A second determination is made that the address is between a previous value of a stack pointer and a current value of the stack pointer. A third determination is made that a write history indicator is set to a specified value. The write operation is performed in the cache memory without waiting for a cache fill corresponding to the address to be performed, in response to the first, second, and third determinations.

20 Claims, 5 Drawing Sheets

SELECTIVE CACHE FILLS IN RESPONSE TO WRITE MISSES

TECHNICAL FIELD

The present embodiments relate generally to cache memory, and more specifically to policies for cache memory write operations.

BACKGROUND

A cache memory (e.g., a write-back cache) may implement a write-allocate policy in which a write miss results in a cache fill operation. In the cache fill operation, a cache line is fetched from a lower level of memory and installed in the cache memory, after which the write is performed. Writes are stalled while the cache fill operation is performed. Cache lines fetched in accordance with the write-allocate policy, however, may sometimes contain data that is no longer referenced by the program being executed.

SUMMARY

Embodiments are disclosed in which cache fills in response to write misses are selectively performed based at least in part on the stack pointer.

In some embodiments, a method of managing a cache memory includes receiving in the cache memory a request to perform a write operation. The request specifies an address. A first determination is made that the cache memory does not include a cache line corresponding to the address. A second determination is made that the address is between a previous value of a stack pointer and a current value of the stack pointer. A third determination is made that a write history indicator is set to a specified value. The write operation is performed in the cache memory without waiting for a cache fill corresponding to the address to be performed, in response to the first, second, and third determinations.

In some embodiments, a cache memory system includes a cache data array to store cache lines. The cache memory system also includes a cache controller to receive requests to perform write operations, the requests specifying addresses; to determine whether the cache data array includes cache lines corresponding to addresses specified in respective write requests; to determine whether addresses specified in respective write requests are between a previous value of a stack pointer and a current value of the stack pointer; to determine whether one or more write history indicators are set to a specified value; and to perform a write operation without first performing a cache fill operation corresponding to an address, in response to determining that the address is between the previous value of the stack pointer and the current value of the stack pointer, that the cache data array does not include a cache line corresponding to the address, and that a write history indicator is set to the specified value.

BRIEF DESCRIPTION OF THE DRAWINGS

The present embodiments are illustrated by way of example and are not intended to be limited by the figures of the accompanying drawings.

Like reference numerals refer to corresponding parts throughout the figures and specification.

DETAILED DESCRIPTION

Reference will now be made in detail to various embodiments, examples of which are illustrated in the accompanying drawings. In the following detailed description, numerous specific details are set forth in order to provide a thorough understanding of the disclosure. However, some embodiments may be practiced without these specific details. In other instances, well-known methods, procedures, components, and circuits have not been described in detail so as not to unnecessarily obscure aspects of the embodiments.

Figure 1:
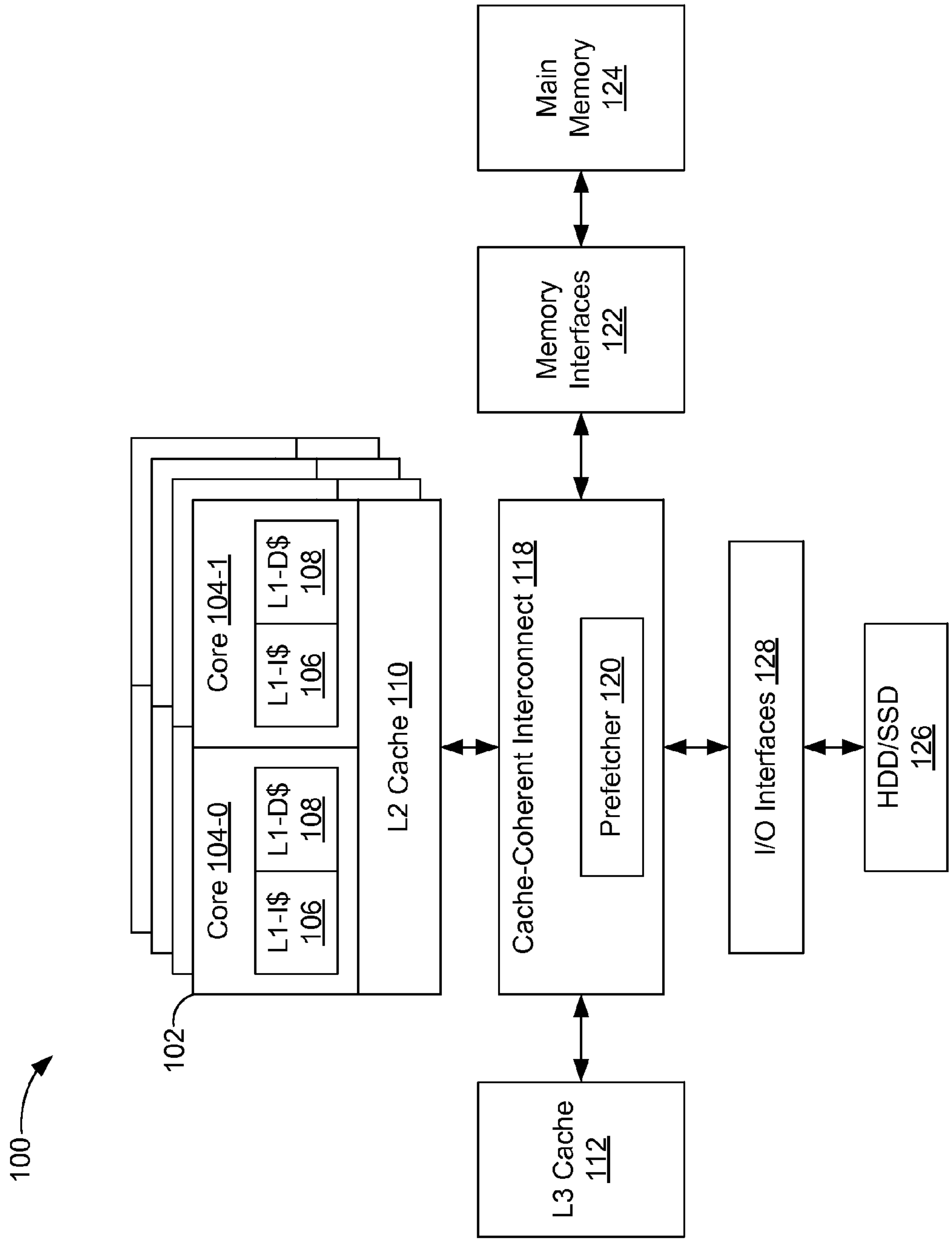
FIG. 1 is a block diagram showing a memory system in accordance with some embodiments.

FIG. 1 is a block diagram showing a memory system 100 in accordance with some embodiments. The memory system 100 includes a plurality of processing modules 102 (e.g., four processing modules 102), each of which includes a first processor core 104-0 and a second processor core 104-1. Each of the processor cores 104-0 and 104-1 includes a level 1 instruction cache memory (L1-I$) 106 to cache instructions to be executed by the corresponding processor core 104-0 or 104-1 and a level 1 data cache (L1-D$) memory 108 to store data to be referenced by the corresponding processor core 104-0 or 104-1 when executing instructions. (The term data as used herein does not include instructions unless otherwise noted.) A level 2 (L2) cache memory 110 is shared between the two processor cores 104-0 and 104-1 on each processing module 102.

A cache-coherent interconnect interconnect 118 couples the L2 cache memories 110 on the processing modules 102 to a level 3 (L3) cache memory 112. In the example of FIG. 1, the L1 cache memories 106 and 108 are the highest-level cache memories in the memory system 100 and the L3 cache memory 112 is the lowest-level cache memory in the memory system 100. Because it is the lowest-level cache memory, the L3 cache memory 112 may be referred to as the last-level cache (LLC). In other examples, a memory system may include an LLC below the L3 cache memory 112. In some embodiments, the L1 cache memories 106 and 108, L2 cache memories 110, and L3 cache memory 112 are implemented using static random-access memory (SRAM).

In addition to coupling the L2 cache memories 110 to the L3 cache memory 112, the cache-coherent interconnect 118 is coupled to main memory 118 through memory interfaces 122. In some embodiments, the main memory 118 is implemented using dynamic random-access memory (DRAM). In some embodiments, the memory interfaces 122 coupling the cache-coherent interconnect 118 to the main memory 124 are double-data-rate (DDR) interfaces. The cache-coherent interconnect 118 is also connected to input/output (I/O) interfaces 128, which allow the cache-coherent interconnect 118, and through it the processing modules 102, to be coupled to peripheral devices. The I/O interfaces 128 may include interfaces to a hard-disk drive (HDD) or solid-state drive (SSD) 126. An SSD 126 may be implemented using Flash memory or other nonvolatile solid-state memory. The main memory 124 and/or HDD/SDD 122 may store one or more applications for execution by the processor cores 104-0 and 104-1.

The cache-coherent interconnect 118 maintains cache coherency throughout the system 100. Examples of cache-coherence protocols that may be implemented in the system 100 include, but are not limited to, MSI (Modified-Shared-Invalid), MOESI (Modified-Owned-Exclusive-Shared-Invalid), MOSI (Modified-Owned-Shared-Invalid), and MESI (Modified-Exclusive-Shared-Invalid) protocols, with each acronym corresponding to the states available in the respective protocol. In some embodiments, the cache-coherence protocol implemented in the system 100 is directory-based or snooping based.

The L1 cache memories 106 and 108, L2 cache memories 110, L3 cache memory 112, and main memory 124 (and in some embodiments, the HDD/SSD 126) form a memory hierarchy in the memory system 100. Each level of this hierarchy has less storage capacity but faster access time than the level below it: the L1 cache memories 106 and 108 offer less storage but faster access than the L2 cache memories 110, which offer less storage but faster access than the L3 cache memory 112, which offers less storage but faster access than the main memory 124.

The memory system 100 is merely an example of a multi-level memory system configuration; other configurations are possible. For example, a processing module 102 may include a single processor core 104-0 or 104-1, which may have a dedicated L2 cache memory 110. Alternatively, a processing module 102 may include three or more processor cores, which may share an L2 cache memory 110. In other embodiments, a memory system may include a single processor core 104-0 or 104-1 with an L1-I$ 106 and L1-D$ 108; the single processor core 104-0 or 104-1 is coupled to an L2 cache memory 110, L3 cache memory 112, main memory 124, and HDD/SSD 126. For single-core systems, cache coherency is not an issue and the cache-coherent interconnect 118 is replaced with an interconnect that does not implement a coherency protocol.

A processor core 104-0 or 104-1 may issue a write request to its respective L1-D$ 108. The write request specifies a virtual address and data to be written to the virtual address. Before performing a write operation in response to the write request, the L1-D$ 108 determines whether it currently stores a cache line corresponding to the specified virtual address. If the L1-D$ 108 does not currently store a cache line corresponding to the specified virtual address, a write miss is said to occur. In response to the write miss, the L1-D$ 108 may implement a write-allocate policy: the cache line corresponding to the specified virtual address is fetched from a lower level of memory (e.g., L2 cache memory 110, L3 cache memory 112, main memory 124, or HDD/SDD 122) and installed in the L1-D$ 108. This fetching and installation of the cache line is referred to as a cache fill operation. Once the cache line has been installed in the L1-D$ 108, the write operation is performed by writing the data specified in the write request to the cache line.

Writes in the processor core 104-0 or 104-1 stall while the cache fill operation is performed in response to a write miss. For example, the processor core 104-0 or 104-1 may include a store buffer (e.g., a post-commit store buffer) coupled to the L1-D$ 108. The stall resulting from a write miss causes back pressure in the store buffer. Also, a fill buffer may be coupled between the L1-D$ 108 and a lower level of memory (e.g., the L2 cache memory 112). The cache fill operation may involve allocation of an entry in the fill buffer for the cache line being fetched.

Furthermore, cache lines fetched in accordance with the write-allocate policy may sometimes contain data that is no longer referenced by the program being executed. Such data is said to be dead. Cache fills therefore may be performed selectively, based on a determination as to whether a respective cache line contains data that is dead. If a cache line corresponding to an address specified in a write request is determined to store data that is known to be dead, the write operation corresponding to the write request is performed without first performing a cache fill. This determination may be based at least in part on the stack pointer.

Figures 2A, 2B, 2C:
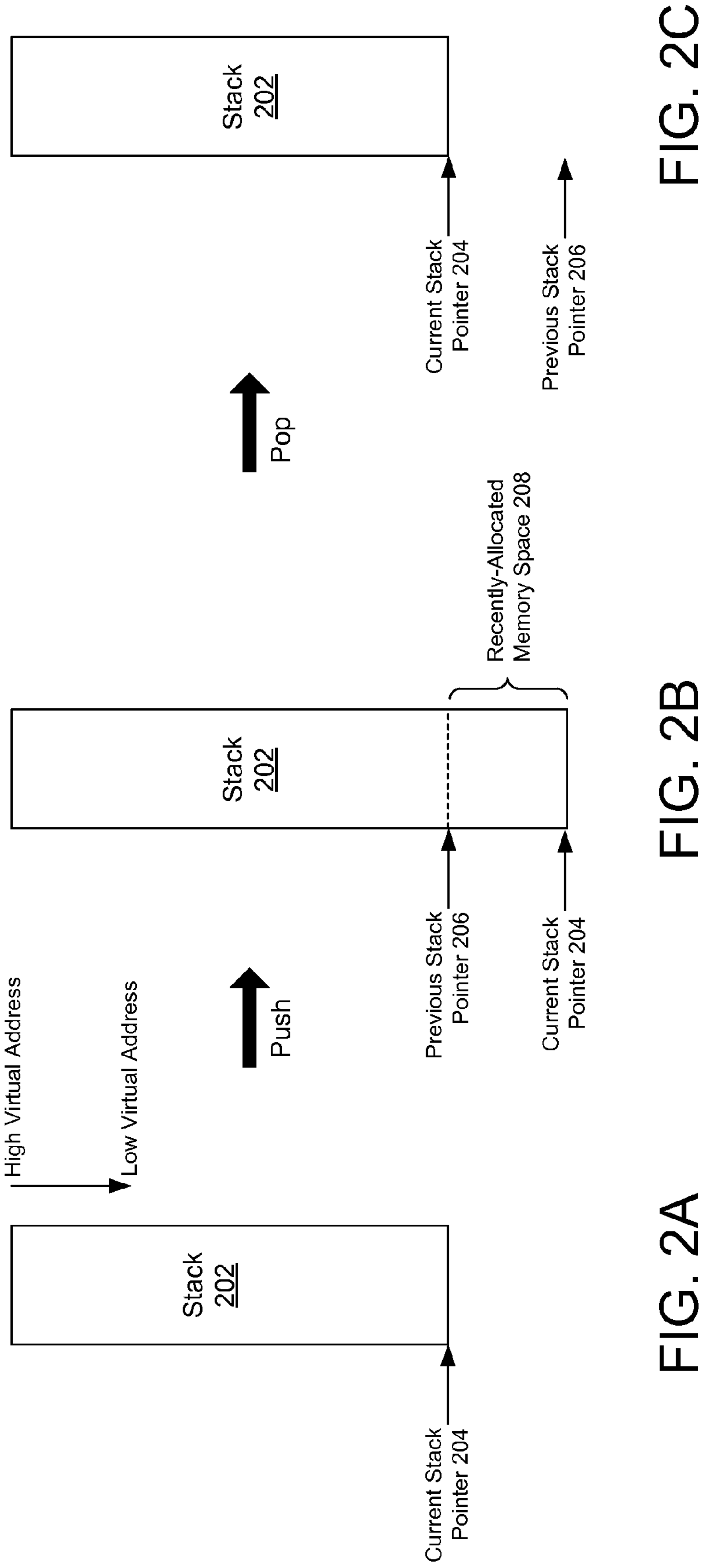
FIGS. 2A-2C show a stack and corresponding stack pointers in accordance with some embodiments.

FIGS. 2A-2C show a stack 202 in accordance with some embodiments. The stack 202, which may also be referred to as a call stack, execution stack, control stack, run-time stack, or machine stack, is a segment of virtual memory in a program being executed by one or more processor cores 104-0 and/or 104-1. The stack 202 grows on function calls and shrinks on returns. In the example of FIGS. 2A-2C, the stack 202 starts at a relatively high virtual address and grows in the direction of lower virtual addresses (e.g., grows toward the heap). Information stored in the stack 202 includes, but is not limited to, return addresses and stack-allocated variables (e.g., local variables and values spilled from registers).

A current stack pointer 204 points to the top of the stack 202. In some embodiments, the current stack pointer 204 points to the first virtual address beyond the stack 202. Because the stack 202 grows in the direction of lower virtual addresses, the current stack pointer 204 therefore points to the first virtual address below the stack 202. Alternatively, the current stack pointer 204 points to the top virtual address in the stack 202, which in the example of FIG. 2A is the lowest virtual address in the stack 202. The stack 202 grows by decrementing the current stack pointer 204 and shrinks by incrementing the current stack pointer 204. A "push" is performed to grow the stack 202 on a function call: information is pushed onto the stack 202 in the memory space allocated to the stack 202 by decrementing the current stack pointer 204. A "pop" is performed to shrink the stack 202 on a return: information in the memory space that is de-allocated from the stack 202 by incrementing the current stack pointer 204 pops off the stack 202.

FIG. 2B illustrates the result of a push: the current stack pointer 204 is decremented with respect to its value in FIG. 2A. A previous stack pointer 206 points to the previous position of the current stack pointer 204. The virtual addresses between the previous stack pointer 206 and current stack pointer 204 compose a memory space 208 allocated for the function call corresponding to the push. (In the example of FIGS. 2A-2C, a virtual address is between the previous stack pointer 206 and current stack pointer 204 if it is below the previous stack pointer 206 and above the current stack pointer 204.) The memory space 208 is said to be recently allocated, because it is allocated by the push that moves the current stack pointer 204 to its new position.

FIG. 2C illustrates the result of a pop associated with the push of FIG. 2B (i.e., corresponding to a return upon completion of the function call for the push of FIG. 2B). The current stack pointer 204 is incremented back to its value in FIG. 2A. The previous stack pointer 206 now points to the virtual address to which the current stack pointer 204 pointed in FIG. 2B. The previous stack pointer 206 in FIG. 2C is beyond the current stack pointer 204 and outside of the stack 202.

While FIGS. 2A-2C illustrate a stack 202 that grows in the direction of decreasing virtual addresses, a stack may also grow in the direction of increasing virtual addresses, such that the current stack pointer is incremented to grow the stack and decremented to shrink the stack.

For a stack 202 that grows in the direction of decreasing virtual addresses, an address is said to be beyond a stack pointer (e.g., the current stack pointer 204 or previous stack pointer 206) is it is less than the address for the stack pointer (i.e., is less than the stack pointer). For a stack that grows in the direction of increasing virtual addresses, an address is said to be beyond a stack pointer is it is greater than the address for the stack pointer (i.e., is greater than the stack pointer). An address beyond the current stack pointer 204 is thus outside of the stack.

For embodiments in which the current stack pointer points to the first virtual address beyond the stack, a virtual address is between the previous stack pointer and current stack pointer if it is equal to or beyond the previous stack pointer but is neither equal to nor beyond the current stack pointer. Such a virtual address is within recently-allocated memory space (e.g., the recently-allocated memory space 208, FIG. 2B). For the stack 202, which grows in the direction of lower virtual addresses, a virtual address is thus between the previous stack pointer 206 and the current stack pointer 204 if it is less than or equal to the previous stack pointer 206 and greater than the current stack pointer 204. For a stack that grows in the direction of higher virtual addresses, a virtual address is thus between the previous stack pointer and the current stack pointer if it is greater than or equal to the previous stack pointer and less than the current stack pointer.

For embodiments in which the current stack pointer points to the top virtual address in the stack, a virtual address is between the previous stack pointer and current stack pointer if it is beyond the previous stack pointer and is not beyond the current stack pointer. Such a virtual address is within recently-allocated memory space (e.g., the recently-allocated memory space 208, FIG. 2B). For the stack 202, which grows in the direction of lower virtual addresses, a virtual address is thus between the previous stack pointer 206 and the current stack pointer 204 if it is less than the previous stack pointer 206 and greater than or equal to the current stack pointer 204. For a stack that grows in the direction of higher virtual addresses, a virtual address is thus between the previous stack pointer and the current stack pointer if it is greater than the previous stack pointer and less than or equal to the current stack pointer.

Figure 3:
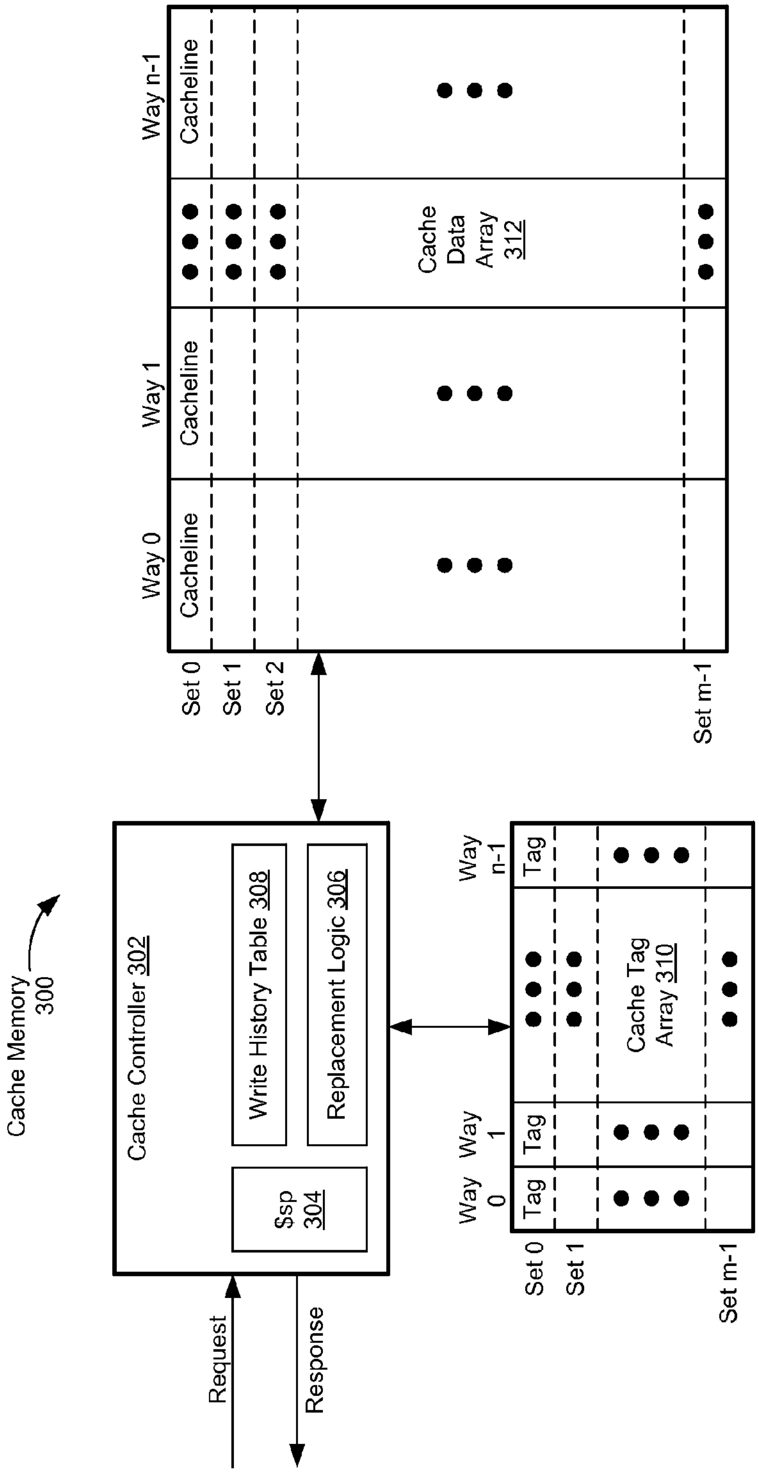
FIG. 3 is a block diagram of a cache memory in accordance with some embodiments.

FIG. 3 is a block diagram of a cache memory 300 in accordance with some embodiments. The cache memory 300 is a particular level of cache memory in the memory system 100 (FIG. 1). For example, the cache memory 300 is an example of an L1-D$ 108, or alternatively is an example of an L2 cache memory 110 or the L3 cache memory 112 (FIG. 1). The cache memory 300 includes a cache data array 312 and a cache tag array 310. A cache controller 302 is coupled to the cache data array 312 and cache tag array 310 to control operation of the cache data array 312 and cache tag array 310.

Addresses (e.g., virtual addresses or corresponding physical addresses) for respective cache lines are divided into multiple portions, including an index and a tag. Cache lines (which may also be referred to as blocks) are installed in the cache data array 312 at locations indexed by the index portions of the corresponding addresses, and tags are stored in the cache tag array 310 at locations indexed by the index portions of the corresponding addresses. (A cache line may correspond to a plurality of addresses that share common index and tag portions.) The cache data array 312 and cache tag array 310 are thus indexed by the index portions of the addresses. In some embodiments, the L1-D$ 108 is indexed by index portions of virtual addresses. In some embodiments, the L2 cache memory 110 and L3 cache memory 112 are indexed by index portions of physical addresses (e.g., as provided by page tables based on corresponding virtual addresses specified in memory access requests such as write requests).

In the example of FIG. 3, the cache data array 312 is set-associative: for each index value, it includes a set of n locations at which a particular cache line may be installed, where n is an integer greater than one. The cache data array 312 is thus divided into n ways, numbered 0 to n−1; each location in a given set is situated in a distinct way. In one example, n is 16. The cache data array 312 includes m sets, numbered 0 to m−1, where m is an integer greater than one. The sets are indexed by the index portions of addresses. The cache tag array 310 is similarly divided into sets and ways.

While FIG. 3 shows a set-associative cache data array 312, the cache data array 312 (and the cache tag array 310) may instead be direct-mapped. A direct-mapped cache effectively only has a single way.

The cache controller 302 includes a stack pointer ($sp) register 304 to store stack pointers (e.g., including the current stack pointer 204 and previous stack pointer 206, FIGS. 2A-2C). The contents of the stack pointer register 304 may be updated in response to instructions that increment or decrement the current stack pointer 204. In some embodiments, the stack pointer register 304 stores both virtual and physical addresses of the stack pointers (e.g., of the current stack pointer 204 and previous stack pointer 206, FIGS. 2A-2C).

The cache controller 302 also includes replacement logic 306 to select cache lines for eviction. The cache controller 302 further includes a write history table 308 that stores write history indicators. The write history indicators indicate, for example, whether a respective cache line or group of cache lines has been written to since being allocated for the stack 202. Examples of the write history table 308 are described below with respect to FIG. 4.

Write requests are provided to the cache controller 302 (e.g., from a processor core 104-0 or 104-1, FIG. 1). Each write request specifies an address (e.g., a virtual address, or corresponding physical address). If a tag stored at a location in the cache tag array 310 indexed by the index portion of the specified address matches the tag portion of the specified address, then a write hit occurs. A write operation is then performed to write the data specified in the write request to the cache line in the set and way that contain the matching tag. If no tag stored at a location in the cache tag array 310 indexed by the index portion of the specified address matches the tag portion of the specified address, however, then a write miss occurs. In the event of a write miss, the cache controller 302 determines whether to perform a cache fill followed by a write operation, or whether to proceed with the write operation without performing a cache fill, despite the write miss. This determination may be based on a comparison of the specified address to the previous stack pointer 206 and current stack pointer 204 (FIGS. 2A-2C), and also based on a value of a corresponding write history indicator in the write history table 308. Examples of this determination are described below for the method 500 of FIG. 5. The cache controller 302 thus selectively implements a write-allocation policy.

Figure 4:
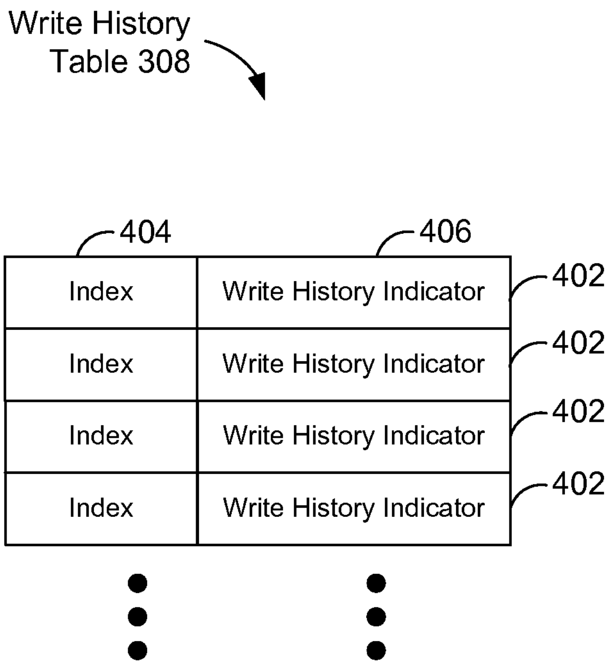
FIG. 4 shows a data structure for a write history table in the cache memory of FIG. 3 in accordance with some embodiments.

FIG. 4 shows a data structure for the write history table 308 (FIG. 3) in accordance with some embodiments. The write history table 308 includes a plurality of rows 402. Each row 402 includes a field 406 to store a bit that serves as a write history indicator and a field 404 to store a corresponding index value. The number of rows 402 in the write history table 308 is arbitrary and may be less than the number of cache lines in the cache data array 312 (FIG. 3). For example, the write history table 308 may include eight rows or 16 rows.

In some embodiments, each row 402 corresponds to a distinct cache line (and thus to a distinct plurality of addresses, since each cache line includes a specified number of addresses). The index values in the fields 404 may equal the offsets of the cache lines from the value of the previous stack pointer 206, such that the rows 402 correspond to the cache lines in the memory space 208 allocated in response to the most recent function call. In one example, the first row 402 corresponds to the cache line identified by the previous stack pointer 206, the second row 402 corresponds to the first cache line beyond the previous stack pointer 206, and so on. In another example, the first row 402 corresponds to the first cache line beyond the previous stack pointer 206, the second row 402 corresponds to the second cache line beyond the previous stack pointer 206, and so on. The write history indicators accordingly are indexed with respect to the value of the previous stack pointer 206.

The write history indicators in the fields 406 are all set to a specified value (e.g., the bits are set to '1', or alternately '0') each time the current stack pointer 204 is decremented to allocate memory space (e.g., memory space 208, FIG. 2B) for the stack 202 (FIG. 2). When a cache line is then written to, the corresponding write history indicator is reset (e.g., the bit is set to '0', or alternately '1'), such that it no longer has the specified value.

In some embodiments, each row 402 corresponds to a distinct group of cache lines (e.g., a group of contiguous cache lines). Each write history indicator in a respective field 406 therefore corresponds to a distinct group of cache lines. The write history indicators in the fields 406 are all set to a specified value (e.g., the bits are set to '1', or alternately '0') each time the current stack pointer 204 is decremented to allocate memory space (e.g., memory space 208, FIG. 2B) for the stack 202 (FIG. 2). When a cache line in a group corresponding to a write history indicator in a respective row 402 is then written to, the write history indicator is reset (e.g., the bit is set to '0', or alternately '1'), such that it no longer has the specified value.

In some embodiments, the write history table 308 is replaced with a register that stores a single write history indicator (e.g., a single bit) for the cache data array 312. The single write history indicator is set to a specified value (e.g., the bit is set to '1', or alternately '0') each time the current stack pointer 204 is decremented to allocate memory space (e.g., memory space 208, FIG. 2B) for the stack 202 (FIG. 2). The single write history indicator is reset (e.g., the bit is set to '0', or alternately '1'), such that it no longer has the specified value, in response to the first eviction of a dirty cache line from the allocated memory space.

Figure 5:
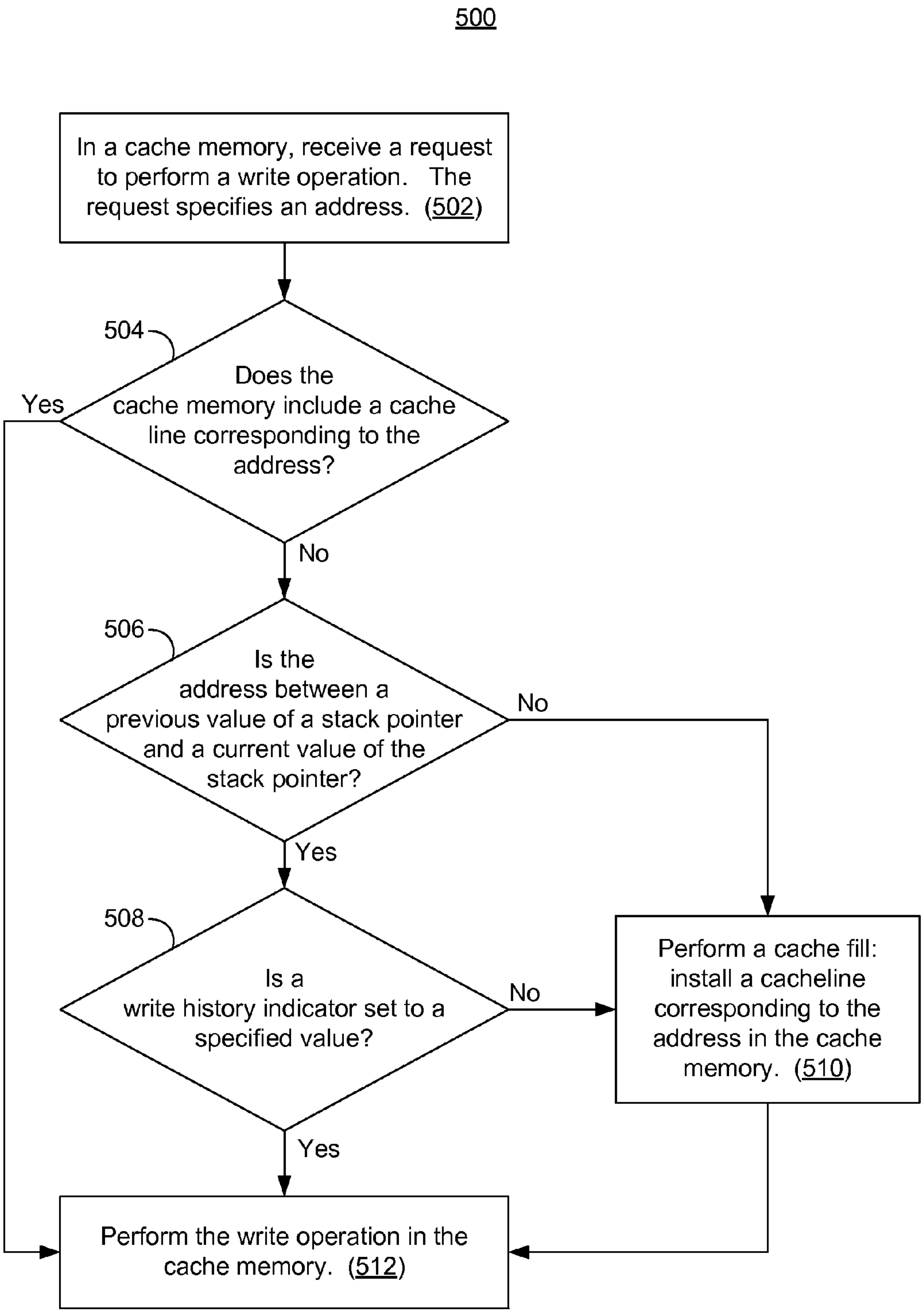
FIG. 5 is a flowchart showing a method of managing a cache memory in accordance with some embodiments.

FIG. 5 is a flowchart showing a method 500 of managing the cache memory 300 (FIG. 3) in accordance with some embodiments. In the method 500, the cache memory 300 (e.g., the cache controller 302, FIG. 3) receives (502) a request (e.g., a write request) to perform a write operation. The request specifies an address.

A determination is made (504) as to whether the cache memory 300 includes a cache line corresponding to the address specified in the request. If it does (504—Yes), a write hit occurs; if it does not (504-No), a write miss occurs.

In the event of a write hit (504—Yes), the write operation corresponding to the request is performed (512) in the cache memory 300. For example, data associated with the request is written to the cache line in the cache data array 312 that produced the write hit.

In the event of a write miss (504—No), a determination is made (506) as to whether the address specified in the request is between a previous value of a stack pointer and a current value of the stack pointer. For example, the cache controller 302 determines whether the address is between the previous stack pointer 206 and current stack pointer 204, and thus is within the allocated memory space 208 (FIG. 2B). The cache controller 302 makes this determination based on stack pointer values stored in the stack pointer register 304.

If the address is not between the previous value of the stack pointer and the current value of the stack pointer (506—No), a cache fill is performed (510). A cache line corresponding to the address is fetched from a lower level of memory and installed in the cache memory 300. For example, data for the cache line is installed in the cache data array 312 and the tag for the cache line is written to a corresponding location in the cache tag array 310. The location in which the cache line is installed may be determined using the replacement logic 306. After the cache fill is performed (510), the write operation corresponding to the request is performed (512) in the newly installed cache line.

If the address is between the previous value of the stack pointer and the current value of the stack pointer (506—Yes), a determination is made (508) as to whether a write history indicator is set to a specified value. In some embodiments, the write history indicator is stored in the write history table 308. For example, the write history indicator is stored in an entry 406 of a row 402 that corresponds to the cache line that includes the address, or to a group of cache lines, one of which includes the address. Alternatively, the write history indicator is a single bit for the entire cache memory 300 (and thus for the entire allocated memory space 208, FIG. 2B) as stored in a register in the cache controller 302.

If the write history indicator is not set to the specified value (508—No), the cache fill is performed (510), followed by the write operation (512).

If, however, the write history indicator is set to the specified value (508—Yes), then the write operation is performed (512) without first performing the cache fill operation. The write operation is performed (512) in a cache line selected based on the address (e.g., in accordance with a replacement policy implemented by the replacement logic 306, FIG. 3). In some embodiments, the width of the data for the request, and thus for the write operation, is less than the cache line width. If so, performing (512) the write operation without first performing the cache fill operation may include writing the data to a specified portion of the cache line and writing predefined data (e.g., zeros) to the remainder of the cache line (e.g., for security purposes).

Performing the write operation without first performing the cache fill operation reduces read bandwidth and avoids a stall in response to the write miss. Back pressure in the store buffer is reduced and fill buffer utilization is reduced.

In some embodiments, the method 500 is performed in a multi-core system (e.g., the system 100, FIG. 1) in accordance with a coherence protocol (e.g., an MSI, MOESI, MESI, or MOSI protocol), such as a directory-based coherence protocol or a snooping-based coherence protocol. The coherence protocol includes an Invalid-to-Modified-via-upgrade state transition that occurs to allow the write operation to be performed without first performing the cache fill operation (e.g., in response to the combination of determinations 504—No, 506—Yes, and 508—Yes). The Invalid-to-Modified-via-upgrade transition asks for exclusive write permission for performing (512) the write operation, but does not ask for the data block that would be fetched to perform (510) the cache fill. If the cache fill is performed (510) before the performing (512) the write operation (e.g., in response to determination 506—No or 508—No), an Invalid-to-Modified transition occurs that asks for both write permission and the data block.

The method 500 may be repeated in response to additional requests to perform write operations.

While the method 500 includes a number of operations that appear to occur in a specific order, it should be apparent that the method 500 can include more or fewer operations, some of which can be executed serially or in parallel. An order of two or more operations may be changed, performance of two or more operations may overlap, and two or more operations may be combined into a single operation. For example, the order of the determinations 504 and 506 may be reversed. In another example, the determination 508 may be omitted, such that the write operation is performed (512) without first performing the cache fill in response to determining (504—No) that the cache memory does not include a cache line corresponding to the address and determining (506—Yes) that the address is between the previous and current values of the stack pointer.

In some embodiments, a system (e.g., the memory system 100, FIG. 1) includes a non-transitory computer-readable medium (e.g., the HDD/SSD 126, FIG. 1, or one or more other nonvolatile memory devices) that stores instructions that, when executed by processor circuitry (e.g., in the cache controller 302, FIG. 3), cause all or a portion of the method 500 (FIG. 5) to be performed.

The foregoing description, for purpose of explanation, has been described with reference to specific embodiments. However, the illustrative discussions above are not intended to be exhaustive or to limit all embodiments to the precise forms disclosed. Many modifications and variations are possible in view of the above teachings. The disclosed embodiments were chosen and described to best explain the underlying principles and their practical applications, to thereby enable others skilled in the art to best implement various embodiments with various modifications as are suited to the particular use contemplated.

What is claimed is:

1. A method of managing cache memory, comprising:

in a cache memory, receiving a first request to perform a first write operation, the first request specifying a first address;

making a first determination that the cache memory does not include a cache line corresponding to the first address;

making a second determination that the first address is between a previous value of a stack pointer and a current value of the stack pointer;

making a third determination that a write history indicator is set to a specified value; and performing the first write operation in the cache memory without waiting for a cache fill corresponding to the first address to be performed, in response to the first, second, and third determinations.

2. The method of claim 1, wherein making the second determination comprises determining that the first address is less than or equal to the previous value of the stack pointer and greater than the current value of the stack pointer.

3. The method of claim 1, further comprising:

storing the write history indicator in an entry of a table that comprises a plurality of entries corresponding to respective cache lines in the cache memory.

4. The method of claim 3, further comprising:

setting the plurality of entries to the specified value when the stack pointer is moved to allocate memory space for stack data; and resetting a respective entry to not have the specified value in response to a write operation in a cache line corresponding to the respective entry.

5. The method of claim 3, further comprising indexing the plurality of entries in the table with respect to the previous value of the stack pointer.

6. The method of claim 1, further comprising:

storing the write history indicator in an entry of a table that comprises a plurality of entries corresponding to respective groups of cache lines in the cache memory;

setting the plurality of entries to the specified value when the stack pointer is moved to allocate memory space for stack data; and resetting a respective entry to not have the specified value in response to a write operation in a cache line in a group corresponding to the respective entry.

7. The method of claim 1, wherein the write history indicator is a single bit for the cache memory, the method further comprising:

setting the single bit to the specified value when the stack pointer is moved to allocate memory space for stack data; and resetting the single bit to not have the specified value in response to eviction of a dirty cache line from the allocated memory space.

8. The method of claim 1, further comprising:

in the cache memory, receiving a second request to perform a second write operation, the second request specifying a second address;

determining that the cache memory does not include a cache line corresponding to the second address, that the second address is between the previous value of the stack pointer and the current value of the stack pointer, and that a write history indicator is not set to the specified value;

in response to the determining, performing a cache fill to install a cache line corresponding to the second address in the cache memory; and performing the second write operation in the cache line corresponding to the second address.

9. The method of claim 1, further comprising:

in the cache memory, receiving a second request to perform a second write operation, the second request specifying a second address;

determining that the second address is not between the previous value of the stack pointer and the current value of the stack pointer;

in response to the determining, performing a cache fill to install a cache line corresponding to the second address in the cache memory; and performing the second write operation in the cache line corresponding to the second address.

10. The method of claim 1, wherein:

a width of data for the first request is less than a cache line width for the cache memory; and performing the first write operation comprises:

writing the data for the first request to a first portion of a selected cache line; and writing zeros to a remainder of the selected cache line.

11. The method of claim 1, wherein:

the first address is a virtual address;

the cache memory comprises a level-one data cache; and the level-one data cache comprises a data array indexed by virtual addresses.

12. The method of claim 1, wherein:

the cache memory comprises a level-one data cache situated in a processor of a multiprocessor system; and the method further comprises obtaining exclusive permission to perform the first write operation in accordance with a cache-coherence protocol.

13. A cache memory system, comprising:

a cache data array to store cache lines; and a cache controller to:

receive requests to perform write operations, the requests specifying addresses;

determine whether the cache data array includes cache lines corresponding to addresses specified in respective write requests;

determine whether addresses specified in respective write requests are between a previous value of a stack pointer and a current value of the stack pointer;

determine whether one or more write history indicators are set to a specified value; and perform a first write operation without first performing a cache fill operation corresponding to a respective first address, in response to determining that the first address is between the previous value of the stack pointer and the current value of the stack pointer, that the cache data array does not include a cache line corresponding to the first address, and that a write history indicator is set to the specified value.

14. The cache memory system of claim 13, wherein the cache controller is to determine whether the addresses specified in the respective write requests are between a previous value of the stack pointer and a current value of the stack pointer by determining whether the addresses are less than or equal to the previous value of the stack pointer and greater than the current value of the stack pointer.

15. The cache memory system of claim 13, wherein:

the write history indicator is a first write history indicator; and the cache memory system further comprises a table storing a plurality of write history indicators including the first write history indicator, wherein respective write history indicators of the plurality correspond to respective cache lines.

16. The cache memory system of claim 13, wherein:

the write history indicator is a first write history indicator; and the cache memory system further comprises a table storing a plurality of write history indicators including the first write history indicator, wherein respective write history indicators of the plurality correspond to respective groups of cache lines.

17. The cache memory system of claim 13, wherein the write history indicator is a single bit for the cache memory array.

18. The cache memory system of claim 13, wherein the cache controller is further to perform a cache fill operation corresponding to a second address, followed by a respective second write operation, in response to determining that the second address is not between the previous value of the stack pointer and the current value of the stack pointer.

19. The cache memory system of claim 13, wherein:

the addresses specified in the requests comprise virtual addresses; and the cache data array comprises an array in a level-one data cache indexed by virtual addresses.

20. A cache memory system, comprising:

means for storing cache lines;

means for performing a write operation in response to a request specifying an address; and means for determining whether to perform a cache fill operation before performing the write operation, based on whether the address is between a previous value of a stack pointer and a current value of the stack pointer, whether a cache line corresponds to the address, and whether a write history indicator is set to a specified value.

* * * * *